(12) United States Patent
Kobayashi et al.

(10) Patent No.: US 9,499,149 B2
(45) Date of Patent: Nov. 22, 2016

(54) BRAKE HYDRAULIC PRESSURE GENERATOR

(71) Applicant: NISSIN KOGYO CO., LTD., Ueda, Nagano (JP)

(72) Inventors: Nobuyuki Kobayashi, Nagano (JP); Ichiro Kobayashi, Nagano (JP); Hiroaki Tokoi, Nagano (JP)

(73) Assignee: AUTOLIV NISSON BRAKE SYSTEMS JAPAN CO., LTD., Nagano (JP)

( * ) Notice: Subject to any disclaimer, the term of this patent is extended or adjusted under 35 U.S.C. 154(b) by 0 days.

(21) Appl. No.: 15/171,718

(22) Filed: Jun. 2, 2016

(65) Prior Publication Data
US 2016/0272183 A1    Sep. 22, 2016

Related U.S. Application Data

(63) Continuation of application No. 14/574,812, filed on Dec. 18, 2014, now Pat. No. 9,381,901.

(30) Foreign Application Priority Data

Dec. 27, 2013  (JP) .................................. 2013-271708

(51) Int. Cl.
*B60T 13/74*  (2006.01)
*B60T 13/58*  (2006.01)
(Continued)

(52) U.S. Cl.
CPC .............. *B60T 13/58* (2013.01); *B60T 13/662* (2013.01); *B60T 13/686* (2013.01); *B60T 13/745* (2013.01); *B60T 2270/82* (2013.01)

(58) Field of Classification Search
CPC ...... B60T 7/042; B60T 8/4081; B60T 13/16; B60T 13/66; B60T 13/662; B60T 13/683; B60T 13/686; B60T 13/745
See application file for complete search history.

(56) References Cited

U.S. PATENT DOCUMENTS 8,851,579 B2 *  10/2014  Ohkubo ................. B60T 7/042
                                                                                    303/113.2
2011/0241419 A1   10/2011  Ohkubo et al.
(Continued)

FOREIGN PATENT DOCUMENTS

EP          2441630        4/2012
JP      A-2005-022465      1/2005
(Continued)

OTHER PUBLICATIONS

European Search Report for related EP Application No. 14199234.4-1756, dated May 11, 2015, 6 pages.
(Continued)

*Primary Examiner* — Vishal Sahni
(74) *Attorney, Agent, or Firm* — Andrew M. Calderon; Roberts Mlotkowski Safran Cole & Calderon

(57) ABSTRACT

First main and second hydraulic pressure paths, master cut valves configured to open and close the first and second main hydraulic pressure paths, respectively, a slave cylinder that operates in accordance with an operation amount of a brake operator, a first communication path that communicates from the slave cylinder to the first main hydraulic pressure path, and a second communication path that communicates from the slave cylinder to the second main hydraulic pressure path are provided. The slave cylinder includes a single hydraulic pressure chamber. The slave cylinder communicates with the first and second communication paths through a common flow path connected to the hydraulic pressure chamber. The slave cylinder is configured to be able to increase a pressure on a downstream side of the first or second main hydraulic pressure path. An on-off valve is provided in at least one of the first and second communication paths.

6 Claims, 7 Drawing Sheets

(51) Int. Cl.
*B60T 13/68* (2006.01)
*B60T 13/66* (2006.01)

(56) References Cited

U.S. PATENT DOCUMENTS

2012/0112525 A1* 5/2012 Shimada .................. B60T 7/042
 303/10
2013/0333375 A1 12/2013 Inoue et al.
2014/0008965 A1* 1/2014 Ito .......................... B60T 8/4081
 303/3

FOREIGN PATENT DOCUMENTS

| JP | 2012106637 | 8/2011 |
| JP | A-2012-101591 | 5/2012 |
| JP | A-2013-252759 | 12/2013 |

OTHER PUBLICATIONS

Japanese Office Action dated Nov. 10, 2015 in related Japanese Application No. 2013-271708, 6 pages.

* cited by examiner

BRAKE HYDRAULIC PRESSURE GENERATOR

CROSS REFERENCE TO RELATED APPLICATION

This application is based on and claims priority under 35 U.S.C. §119 to Japanese Patent Application No. 2013-271708 (filed on Dec. 27, 2013), the entire contents of which are incorporated herein by reference.

BACKGROUND

1. Technical Field

Exemplary embodiments of the invention relate to a brake hydraulic pressure generator for use in a vehicle brake system.

2. Related Art

A brake-by-wire type brake hydraulic pressure generator (for example, described in JP 2012-106637 A) has been known as a hydraulic pressure generator for generating brake hydraulic pressure in accordance with an operation amount of a brake operator.

The brake hydraulic pressure generator includes an input device and a slave cylinder device. The input device includes a master cylinder and a stroke simulator. The master cylinder generates a brake hydraulic pressure by means of a piston connected to the brake operator. The stroke simulator imparts a pseudo operational reaction force to the brake operator. The slave cylinder device includes an electric motor and a piston that is driven by the electric motor.

In a vehicle brake system including the brake hydraulic pressure generator, the electric motor of the slave cylinder device is driven in accordance with the operation amount of the brake operator, and the piston which operates by the driving of the electric motor causes a brake hydraulic pressure to act on wheel brakes.

SUMMARY

In the brake hydraulic pressure generator according to JP 2012-106637 A, a tandem type cylinder having two pistons is used for each of the master cylinder and the slave cylinder. Therefore, the input device and the slave cylinder device are large in size.

If single-type pistons are used as the master cylinder and the slave cylinder in order to avoid increase in size of each device, it is concerned that when brake liquid in one of two hydraulic pressure paths decreases, influence of the decrease may reach the other hydraulic pressure path.

One exemplary embodiment of the invention provides a brake hydraulic pressure generator that is small in size and in which even if brake liquid decreases in one of two hydraulic pressure paths, influence of the decrease hardly reaches the other hydraulic pressure path.

(1) According to one exemplary embodiment, a brake hydraulic pressure generator includes a first brake system, a second brake system, a master cylinder, a first main hydraulic pressure, a second main hydraulic pressure path, master cut valves, a slave cylinder, a first communication path, and a second communication path. The first brake system communicates with at least one of a plurality of wheel brakes. The second brake system communicates with the other wheel brakes. The master cylinder operates in response to driver's operation of a brake operator. The first main hydraulic pressure path is provided in the first brake system and connects between the master cylinder and the at least one wheel brakes. The second main hydraulic pressure path is provided in the second brake system and connects between the master cylinder and the other wheel brakes. The master cut valves are provided in the first main hydraulic pressure path and the second main hydraulic pressure path, respectively. The master cut valves is configured to open and close the first main hydraulic pressure path and the second main hydraulic pressure path, respectively. The slave cylinder is operated by an electric actuator which is driven in accordance with an operation amount of the brake operator. The first communication path connects between the slave cylinder and the first main hydraulic pressure path. The second communication path connects between the slave cylinder and the second main hydraulic pressure path. The slave cylinder includes a single hydraulic pressure chamber. The slave cylinder communicates with the first communication path and the second communication path through a common flow path connected to the hydraulic pressure chamber. The slave cylinder is configured to be able to increase a pressure in the first main hydraulic pressure path or the second main hydraulic pressure path on a downstream side of corresponding one of the master cut valves, through the first communication path or the second communication path. An on-off valve is provided in at least one of the first communication path and the second communication path.

In the brake hydraulic pressure generator configured as described above, the slave cylinder is configured to include the single hydraulic pressure chamber. Therefore, the slave cylinder can be formed to be smaller as compared with the case where the slave cylinder is of a tandem type. Hence, the brake hydraulic pressure generator can be made smaller in size.

Also, since the on-off valve is provided in the at least one of the first communication path and the second communication path, it is possible to block off the brake liquid flowing from the slave cylinder into at least one of the hydraulic pressure paths. That is, with the above configuration, in spite of minimizing of the number of control valves, it is possible to realize a state where the brake liquid is prevented from flowing from the slave cylinder into one of the hydraulic pressure paths while the brake liquid is allowed to flow from the slave cylinder into the other hydraulic pressure path. Thus, even if the brake liquid decreases in the one of the hydraulic pressure paths, the hydraulic pressure can be increased in the other hydraulic pressure path by the slave cylinder.

(2) In the brake hydraulic pressure generator of (1), the on-off valve may include a normally open solenoid valve. With this configuration, the on-off valve may be controlled to be closed only when the brake liquid is to be prevented from flowing from the slave cylinder into the hydraulic pressure path. It is, therefore, possible to reduce the power consumption in normal time.

(3) In the brake hydraulic pressure generator of any one of (1) to (2), each master cut valve may include a three-way valve configured to change over between (i) a state where connection is established between a master cylinder side and a wheel brake side while disconnection is established between a slave cylinder side and the wheel brake side and (ii) a state where disconnection is established between the master cylinder side and the wheel brake side while connection is established between the slave cylinder side and the wheel brake side. With this configuration, switching between the connection and the disconnection can be achieved by the single valve. Thus, the configuration of the brake hydraulic pressure generator can be simplified. This contributes to miniaturization of the brake hydraulic pressure generator.

(4) The brake hydraulic pressure generator of any one of (1) to (3) may further include a pressure sensor and a controller. The pressure sensor may be disposed in the first main hydraulic pressure path or the second main hydraulic pressure path on the downstream side of the corresponding one of the master cut valves. The controller may be configured to execute control to open and close the on-off valve. A detection value of the pressure sensor may be input to the controller. The on-off valve may be disposed in the first communication path. The pressure sensor may be provided in the second main hydraulic pressure path. The controller may be configured to determine as to whether or not the detection value of the pressure sensor has increased to a value corresponding to the operation amount of the brake operator and to execute control to close the on-off valve if the controller determines that the detection value has not increased to the value. With this configuration, the decrease of the brake liquid in the second main hydraulic pressure path can be detected by the pressure sensor. Also, when the on-off valve is controlled to be closed, the first communication path is blocked off so that the hydraulic pressure generated in the slave cylinder can be applied only to the second main hydraulic pressure path.

(5) In the brake hydraulic pressure generator of (4), if the detection value of the pressure sensor is resumed to the value corresponding to the operation amount of the brake operator after executing the control to close the on-off valve, the controller may continue control to increase pressure by the slave cylinder while keeping the on-off valve in a closed state. In the case where the detection value of the pressure sensor is resumed (increases) to a value corresponding to the operation amount of the brake operator after the on-off valve is controlled to be closed, it can be understood that the brake liquid has decreased in the first main hydraulic pressure path blocked off by the on-off valve. In this case, pressure increase control by the slave cylinder is continued so that braking of the wheel brakes by the slave cylinder can be ensured in the second main hydraulic pressure path.

On the other hand, in the case where the detection value of the pressure sensor is not resumed to the value corresponding to the operation amount of the brake operator after the on-off value is controlled to be closed, it can be understood that the brake liquid has decreased in the second main hydraulic pressure path (the hydraulic pressure path on which the pressure sensor is provided). In this case, the master cut valve is changed over in the first main hydraulic pressure path so as to connect between the master cylinder and each wheel brake. In this manner, the hydraulic pressure generated by the master cylinder can be transmitted directly to the wheel brake through the first main hydraulic pressure path.

(6) In the brake hydraulic pressure generator of any one of (1) to (5), the master cylinder may include two pistons. The master cylinder may be configured to be able to output a hydraulic pressure generated in the master cylinder to the first main hydraulic pressure path and the second main hydraulic pressure path. The brake hydraulic pressure generator may further include a master pressure sensor and a simulator. The master pressure sensor is disposed in one of the first main hydraulic pressure path and the second main hydraulic pressure path and is configured to detect the hydraulic pressure generated in the master cylinder. The simulator is disposed in the other of the first main hydraulic pressure path and the second main hydraulic pressure path through a valve and is configured to impart to the brake operator an operational reaction force corresponding to the operation of the brake operator, in a pseudo manner. With this configuration, the brake hydraulic pressure generation can be configured suitably so that the master cylinder includes a plurality of hydraulic pressure chambers sectioned by the two pistons and the slave cylinder includes the single hydraulic pressure chamber.

With the above configurations, it is possible to provide a brake hydraulic pressure generator that can be reduced in size. Also, even if brake liquid decreases in one of the two hydraulic pressure paths, influence of the decrease hardly reaches the other hydraulic pressure path.

DETAILED DESCRIPTION

Exemplary embodiments of the invention will be described in detail below with reference to the accompanying drawings. A case where a brake hydraulic pressure generator according to each embodiment is applied to a vehicle brake system A shown in FIG. 1 will be described by way of example.

First Embodiment

Figure 1:
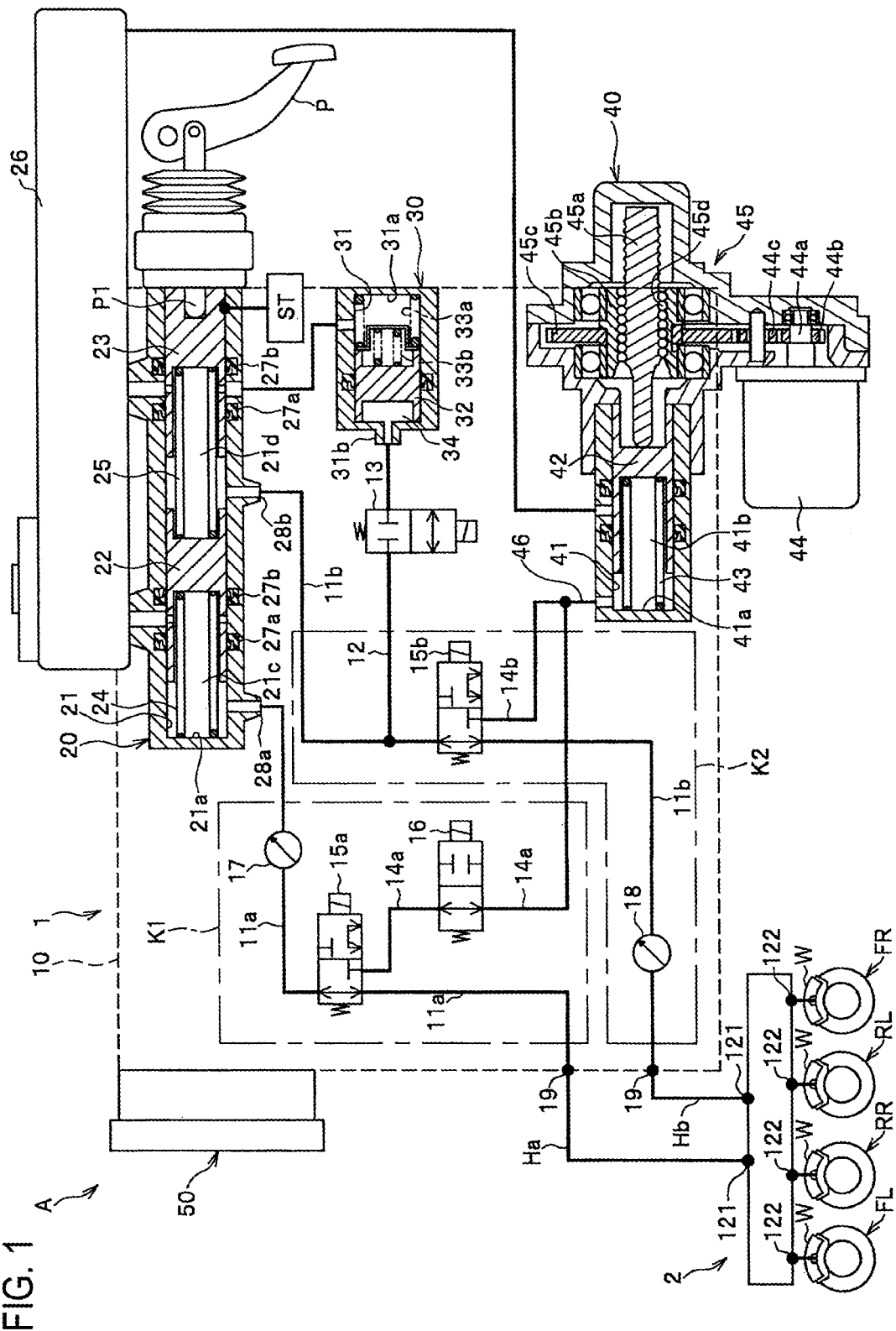
FIG. 1 is a hydraulic pressure circuit diagram showing a vehicle brake system including a brake hydraulic pressure generator according to a first embodiment of the invention.

The vehicle brake system A includes both a by-wire type brake system that operates when a motor (such as an engine or an electric motor) starts up and a hydraulic type brake system that operates when the motor stops, as shown in FIG. 1.

The vehicle brake system A includes a brake hydraulic pressure generator 1 and a hydraulic pressure control device 2. The brake hydraulic pressure generator 1 generates brake hydraulic pressure in accordance with an operation amount of a brake pedal P (an example of a "brake operator"). The hydraulic pressure control device 2 supports stabilization of vehicle behavior.

The vehicle brake system A can be mounted on a hybrid car including an engine (internal combustion engine) and a motor as power sources, an electric car or a fuel cell car including only a motor as a power source, etc. as well as a car including only an engine as a power source.

The brake hydraulic pressure generator 1 includes a master cylinder 20, a stroke simulator 30, a slave cylinder 40 and an electronic control unit 50 (an example of a "controller"). The master cylinder 20 is of a tandem type and includes two pistons 22 and 23 that generate a brake hydraulic pressure in accordance with pedal effort on the brake pedal P. The stroke simulator 30 imparts a pseudo operational reaction force to the brake pedal P. The slave cylinder 40 drives a motor 44 (electric actuator) in accordance with an operation amount of the brake pedal P so as to generate a brake hydraulic pressure.

In the brake hydraulic pressure generator 1, the master cylinder 20, the stroke simulator 30, the slave cylinder 40 and the electronic control unit 50 are provided in a single base body 10.

A first brake system K1 and a second brake system K2 are provided within the base body 10. A first main hydraulic pressure path 11*a* leading from the master cylinder 20 to wheel brakes FL and RR is provided in the brake system K1. A second main hydraulic pressure path 11*b* leading from the master cylinder 20 to the other wheel brakes RL and FR is provided in the second brake system K2. Also, a branch hydraulic pressure path 12 and two communication paths 14*a* and 14*b* are formed in the base body 10. A first pressure sensor 17 is provided in the first main hydraulic pressure path 11*a*. A second pressure sensor 18 is provided in the second main hydraulic pressure path 11*b*.

The master cylinder 20 includes a first piston 22, a second piston 23, a first elastic member 24, and a second elastic member 25. The first piston 22 and the second piston 23 are inserted into a first cylinder hole 21 having a bottomed cylindrical shape. The first elastic member 24 and the second elastic member 25 are housed in the first cylinder hole 21. A reservoir 26 that accumulates brake liquid is placed along the master cylinder 20.

A first pressure chamber 21*c* is formed between a bottom surface 21*a* of the first cylinder hole 21 and the first piston 22. The first elastic member 24 that is a coil spring is inserted in the first pressure chamber 21*c*.

A second pressure chamber 21*d* is formed between the first piston 22 and the second piston 23. Also, the second elastic member 25 that is a coil spring is inserted in the second pressure chamber 21*d*. A pair of cup seals 27*a* and 27*b* are attached to an inner circumferential surface of the first cylinder hole 21 through annular groove portions, respectively.

An end portion of the second piston 23 is connected to the brake pedal P through a push rod P1. In response to the pedal effort on the brake pedal P, the first piston 22 and the second piston 23 slide in the first cylinder hole 21 so as to apply pressure to brake liquid in the two pressure chambers 21*c* and 21*d*. The brake liquid pressurized in the pressure chambers 21*c* and 21*d* is output through output ports 28*a* and 28*b* provided in the first cylinder hole 21.

The first main hydraulic pressure path 11*a* is connected to the output port 28*a*. The second main hydraulic pressure path 11*b* is connected to the output port 28*b*. The first main hydraulic pressure path 11*a* and the second main hydraulic pressure path 11*b* are connected to the hydraulic pressure control device 2 located on a downstream side.

The stroke simulator 30 includes a simulator piston 32 and two elastic members 33*a* and 33*b*. The simulator piston 32 is inserted in a second cylinder hole 31. The elastic members 33*a* and 33*b* are coil springs inserted between a bottom surface 31*a* of the second cylinder hole 31 and the simulator piston 32.

A pressure chamber 34 is formed in the second cylinder hole 31. The pressure chamber 34 is formed between an introduction port 31*b* and the simulator piston 32. The pressure chamber 34 communicates with the second pressure chamber 21*d* of the first cylinder hole 21 through the branch hydraulic pressure path 12, the second main hydraulic pressure path 11*b* and the output port 28*b*. Accordingly, when brake hydraulic pressure is generated in the second pressure chamber 21*d* of the master cylinder 20 in response to an operation of the brake pedal P, the simulator piston 32 of the stroke simulator 30 moves against a biasing force of the elastic member 33. As a result, a pseudo operational reaction force is imparted to the brake pedal P.

The slave cylinder 40 includes a single slave cylinder piston 42, an elastic member 43, the motor 44, and a drive transmission portion 45. The slave cylinder piston 42 is inserted in a third cylinder hole 41. The elastic member 43 is housed in the third cylinder hole 41.

A hydraulic pressure chamber 41*b* is formed between a bottom surface 41*a* of the third cylinder hole 41 and the slave cylinder piston 42. The elastic member 43 which is a coil spring is inserted in the hydraulic pressure chamber 41*b*.

The hydraulic pressure chamber 41*b* of the slave cylinder 40 communicates with the first main hydraulic pressure path 11*a* through the first communication path 14*a*. The hydraulic pressure chamber 41*b* also communicates with the second main hydraulic pressure path 11*b* through the second communication path 14*b* branching off from the first communication path 14*a*.

The motor 44 is an electric servo motor which is driven under control of the electronic control unit 50. A driving gear 44*b* which is a spur gear is attached to an output shaft 44*a* of the motor 44. The driving gear 44*b* meshes with a driven gear 45*c* of the drive transmission portion 45 through a gear 44*c*.

The drive transmission portion 45 translates a rotation drive force of the output shaft 44*a* of the motor 44 into a linear axial force.

The drive transmission portion 45 includes a rod 45*a*, a cylindrical nut member 45*b*, and the driven gear 45*c*. The rod 45*a* abuts against the slave cylinder piston 42. The cylindrical nut member 45*b* surrounds the rod 45*a*. The driven gear 45*c* is the spur gear formed the entire periphery of the nut member 45*b*.

A spiral screw groove is formed in an outer peripheral surface of the rod 45*a*. A plurality of balls 45*d* are housed in the screw groove so as to be rollable. The nut member 45*b* is screwed with the balls 45*d*. In this manner, a ball screw mechanism is provided between the nut member 45*b* and the rod 45*a*.

Barings 45*e* are disposed on both sides of the driven gear 45*c* across the driven gear 45*c*. The nut member 45*b* is supported through the bearings 45*e* so as to be rotatable around the rod 45*a*.

When the output shaft 44*a* rotates, the rotation drive force of the output shaft 44*a* is input to the nut member 45*b* through the driving gear 44*b*, the gear 44*c* and the driven gear 45*c*. Then, the linear axial force is imparted to the rod 45*a* by the ball screw mechanism provided between the nut member 45*b* and the rod 45*a*. Thus, the rod 45*a* advances and retracts in forward and rear directions.

When the rod 45*a* moves toward the slave cylinder piston 42, the slave cylinder piston 42 receives an input from the rod 45*a* and slides in the third cylinder hole 41 to thereby apply pressure to the brake liquid in the hydraulic pressure chamber 41*b*.

Next, the hydraulic pressure paths formed in the base body 10 will be described.

The two main hydraulic pressure paths 11a and 11b are hydraulic pressure paths starting from the first cylinder hole 21 of the master cylinder 20.

The first main hydraulic pressure path 11a communicates with the first pressure chamber 21c of the master cylinder 20. On the other hand, the second main hydraulic passage 11b communicates with the second pressure chamber 21d of the master cylinder 20. Pipes Ha and Hb reaching the hydraulic pressure device 2 are connected to two output ports 19 at which the two main hydraulic pressure paths 11a and 11b end.

The branch hydraulic pressure path 12 is a hydraulic pressure path extending from the pressure chamber 34 of the stroke simulator 30 to the second main hydraulic pressure path 11b. A normally close solenoid valve 13 serving as a valve is provided in the branch hydraulic pressure path 12. The normally close solenoid valve 13 is configured to open and close the branch hydraulic pressure path 12.

Each of the two communication paths 14a and 14b is a hydraulic pressure path starting from the third cylinder hole 41 of the slave cylinder 40. The two communication paths 14a and 14b merge with a common hydraulic pressure path 46 before reaching the third cylinder hole 41. Thus, the two communication paths 14a and 14b are connected to the third cylinder hole 41 as a single fluid path. The first communication path 14a makes communication between the hydraulic pressure chamber 41b and the first main hydraulic pressure path 11a. The second communication path 14b communicates with the hydraulic pressure chamber 41b and the second main hydraulic pressure path 11b.

A first changeover valve 15a (an example of a "master cut valve") which is a three-way valve is provided in a connection portion between the first main hydraulic passage 11a and the first communication path 14a.

The first changeover valve 15a is a 2-position 3-port solenoid valve. In a first position, the first changeover valve 15a connects between an upstream side (master cylinder 20 side) of the first main hydraulic pressure path 11a and a downstream side (output port 19 side, the wheel brakes FL and RR) of the first main hydraulic pressure path 11a while disconnecting between the first communication path 14a and the downstream side of the first main hydraulic pressure path 11a. In a second position, the first changeover valve 15a disconnects between the upstream side of the first main hydraulic pressure path 11a and the downstream side of the first main hydraulic pressure path 11a while connecting between the first communication path 14a and the downstream side of the first main hydraulic pressure path 11a.

A second changeover valve (an example of a "master cut valve") which is a three-way valve is provided in a connection portion between the second main hydraulic pressure path 11b and the second communication path 14b.

The second changeover valve 15b is a 2-position 3-port solenoid valve. In a first position, the second changeover valve 15b connects between an upstream side (master cylinder 20 side) of the second main hydraulic pressure path 11b and a downstream side (output port 19 side, the other wheel brakes RL and FR) of the second main hydraulic pressure path 11b while disconnecting between the second communication path 14b and the downstream side of the second main hydraulic pressure path 11b. In a second position, the second changeover valve 15b disconnects between the upstream side of the second main hydraulic pressure path 11b and the downstream side of the second main hydraulic pressure path 11b while connecting between the second communication path 14b and the downstream side of the second main hydraulic pressure path 11b.

Each of the first changeover valve 15a and the second changeover valve 15b is changed over from one position to the other position by the electronic control unit 50.

A normally open solenoid valve 16 serving as an on-off valve is provided in the first communication path 14a. The normally open solenoid valve 16 opens and closes the first communication path. The on/off state of the normally open solenoid valve 16 is changed over by the electronic control unit 50.

Each of the two pressure sensors 17 and 18 detects a magnitude of a brake hydraulic pressure. Information (detection values) acquired by the two pressure sensors 17 and 18 are input to the electronic control unit 50.

The first pressure sensor 17 is disposed in the first main hydraulic pressure path 11a on an upstream side of the first changeover valve 15a. The first pressure sensor 17 serves as a master pressure sensor that detects a brake hydraulic pressure generated in the master cylinder 20.

The second pressure sensor 18 is disposed in the second main hydraulic pressure path 11b on a downstream side of the second changeover valve 15b. The second pressure sensor 18 detects a brake hydraulic pressure generated in the slave cylinder 40 in a state where the downstream side of the second main hydraulic pressure path 11b and the second communication path 14b communicate with each other through the second changeover valve 15b.

In this manner, the second pressure sensor 18 is disposed in another system (the system of the second main hydraulic pressure path 11b) than a system (the system of the first main hydraulic pressure path 11a) where the aforementioned normally open solenoid valve 16 is disposed.

The electronic control unit 50 houses a control board (not shown) therein. The electronic control unit 50 is attached to a side surface of the base body 10 or the like.

The electronic control unit 50 executes control to operate the motor 44, open/close the normally close solenoid valve 13, open/close the normally open solenoid valve 16 and change over the two changeover valves 15a and 15b, based on information (detection values) acquired from various sensors such as the two pressure sensors 17 and 18 and a stroke sensor ST, and programs that are stored in advance.

Figure 3:
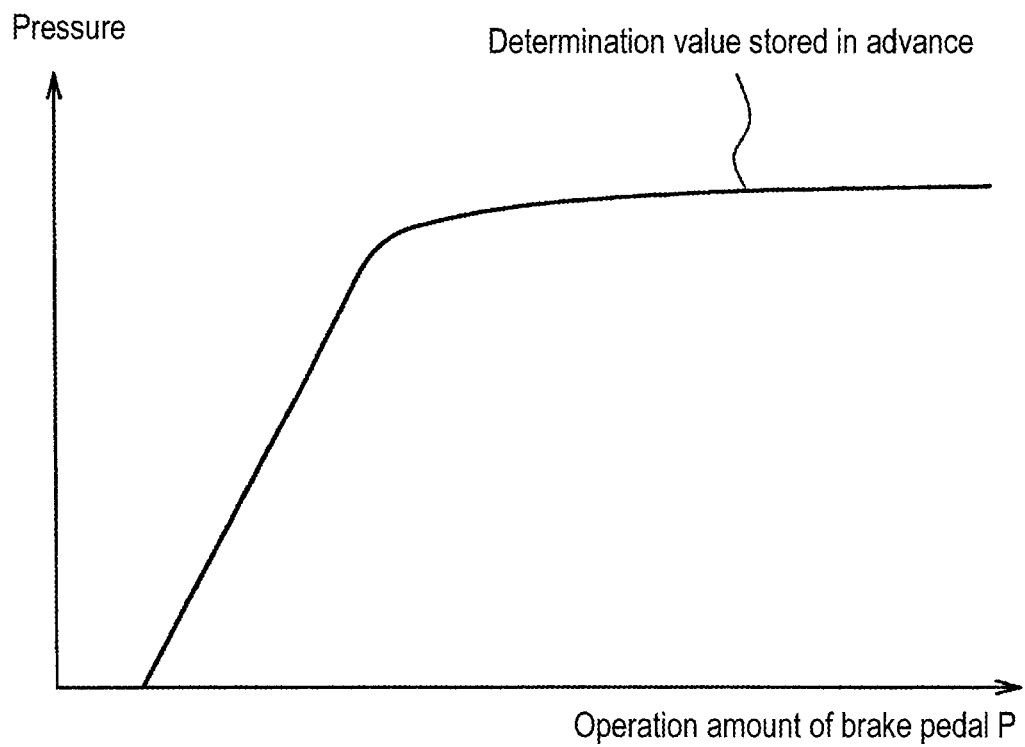
FIG. 3 is a graph showing a relationship between an operation amount of a brake pedal and a pressure.

The electronic control unit 50 determines as to whether or not a brake hydraulic pressure on the downstream side of the first main hydraulic pressure path 11a and a brake hydraulic pressure on the downstream side of the second main hydraulic pressure path 11b have increased to a brake hydraulic pressure corresponding to an operation amount of the brake pedal P. Specifically the electronic control unit 50 determines as to whether or not the brake hydraulic pressure detected by the second pressure sensor 18 has increased to the brake hydraulic pressure corresponding to the operation amount (detected by the stroke sensor ST) of the brake pedal P (whether or not the detected brake hydraulic pressure has increased to a determination value which is programmed in advance), in accordance with a program stored in advance, as shown in FIG. 3. When the electronic control unit 50 determines that the brake hydraulic pressure detected by the second pressure sensor 18 has not increased to the brake hydraulic pressure corresponding to the operation amount of the brake pedal P, the electronic control unit 50 then executes control to close the normally open solenoid valve 16 (executes stroke control based on the operation amount of the brake pedal P).

After executing the control to close the normally open solenoid valve 16, the electronic control unit 50 again determines as to whether or not the brake hydraulic pressure on the downstream side of the first main hydraulic pressure path 11a and the brake hydraulic pressure on the downstream side of the second main hydraulic pressure path 11b have increased (or have been resumed) to the brake hydraulic pressure corresponding to the operation amount of the brake pedal P. Specifically the electronic control unit 50 determines as to whether or not the brake hydraulic pressure detected by the second pressure sensor 18 has increased (or has been resumed) to the brake hydraulic pressure corresponding to the operation amount of the brake pedal P. If the electronic control unit 50 determines that the brake hydraulic pressure has been resumed, the electronic control unit 50 then continues control to increase the pressure of the slave cylinder 40 while keeping the normally open solenoid valve 16 in the closed state.

On the other hand, if the electronic control unit 50 determines that the brake hydraulic pressure has not been resumed, the electronic control unit 50 brings the normally open solenoid valve 16 into an open state (back to its initial state) and executes control to stop the motor 44, brings the normally close solenoid valve 13 into a closed state (back to its initial state) and executes control to change over the first changeover valve 15a (back to its initial state) so that the upstream side and downstream side of the first main hydraulic pressure path 11a communicate with each other.

The hydraulic pressure control device 2 is configured to execute various hydraulic pressure control such as antilock brake control or behavior stabilization control by controlling a brake hydraulic pressure applied to each of wheel cylinders W of the wheel brakes FL, RR, RL and FR suitably. The hydraulic pressure control device 2 is connected to the wheel cylinders W through pipes.

Figure 2:
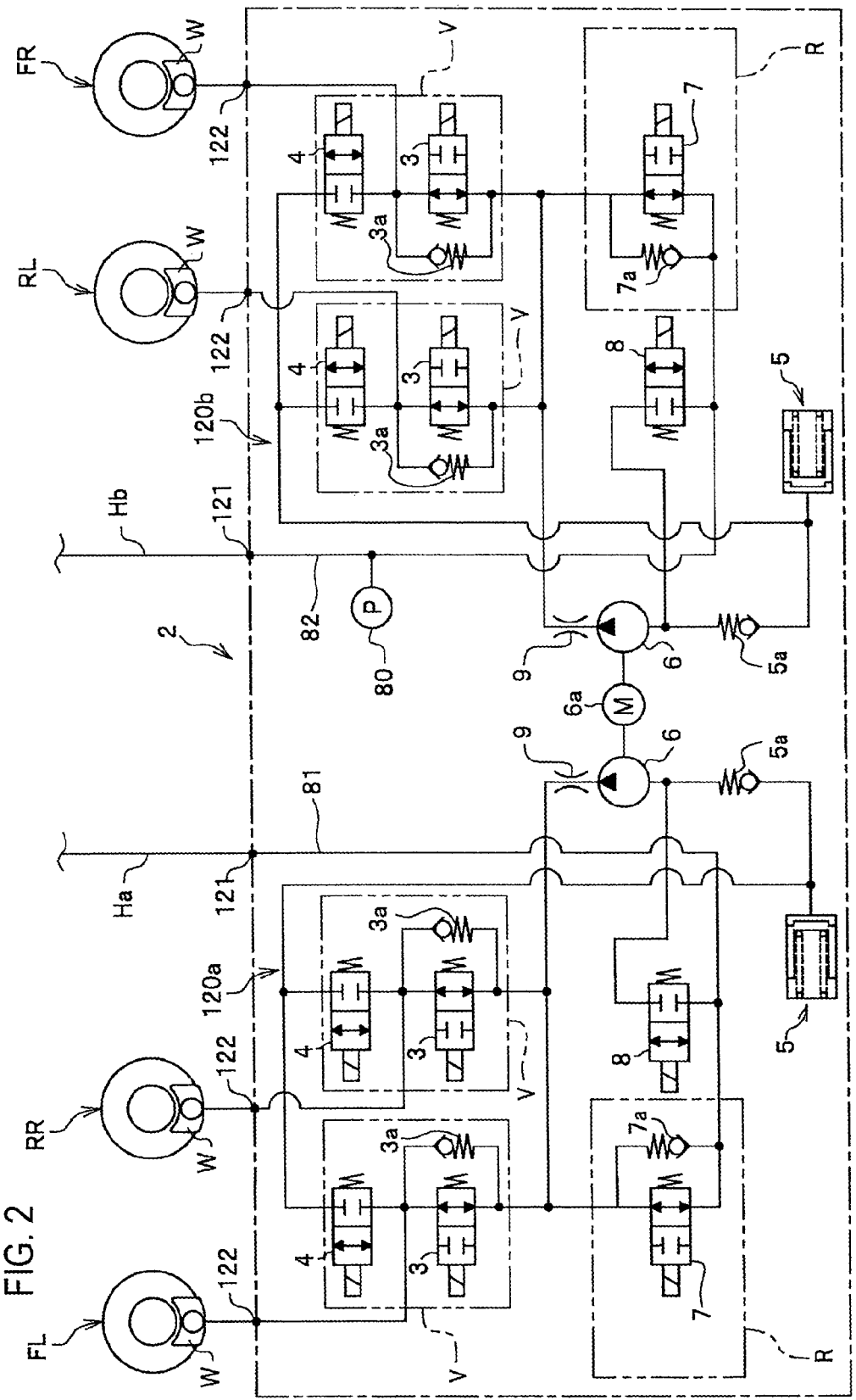
FIG. 2 is a hydraulic pressure circuit diagram of a hydraulic pressure control device provided in the vehicle brake system shown in FIG. 1.

The hydraulic pressure control device 2 is disposed between the brake hydraulic pressure generator 1 and the wheel brakes FL, RR, RL and FR as shown in FIG. 1. As shown in FIGS. 1 and 2, pipes Ha and Hb connected to the output ports 19 of the base body 10 are connected to inlet ports 121 of the hydraulic control device 2. The respective wheel brakes FL, RR, RL and FR are connected to outlet ports 122 of the hydraulic pressure control device 2 through pipes. In normal time, brake hydraulic pressures output from the brake hydraulic pressure generator 1 are applied to the respective wheel cylinders W of the wheel brakes FL, RR, RL and FR through the two main hydraulic pressure paths 11a and 11b in accordance with the pedal effort on the brake pedal P.

Here, a hydraulic pressure path 81 communicating with the pipe Ha extending from the first brake system K1 communicates with the wheel brake FL for the left front wheel and the wheel brake RR for the right rear wheel. Also, a hydraulic pressure path 82 communicating with the pipe Hb extending from the second brake system K2 communicates with the wheel brake FR for the right front wheel and the wheel brake RL for the left rear wheel. A system including the hydraulic pressure path 81 will be referred to as a "first hydraulic pressure system 120a." A system including the hydraulic pressure path 82 will be referred to as a "second hydraulic pressure system 120b."

In the hydraulic pressure control device 2, two control valve units V corresponding to the wheel brakes FL and RR respectively are provided in the first hydraulic pressure system 120a. Similarly, two control valve units V corresponding to the wheel brakes RL and FR respectively are provided in the second hydraulic pressure system 120b. Also, a reservoir 5, a pump 6, an orifice 9, a pressure regulating valve (regulator) R, and a suction valve 8 are provided in each of the first system 120a and the second system 120b. Furthermore, a common motor 6a that drives the pump 6 of the first hydraulic pressure system 120a and the pump 6 of the second hydraulic pressure system 120b is provided in the hydraulic pressure control device 2.

Each control valve unit V is valves configured to control transmission of hydraulic pressures from the brake hydraulic pressure generator 1 and the pump 6 to the corresponding wheel brake FL, RR, RL, FR (particularly, the corresponding wheel cylinder W). Each control valve unit V can increase, keep, and decrease the pressure imparted to the wheel cylinder W. Each control valve unit V includes an inlet valve 3, an outlet valve 4, and a check valve 3a.

Each inlet valve 3 is, for example, a normally open proportional solenoid valve. Each inlet valve 3 is disposed in a hydraulic pressure path from the corresponding hydraulic pressure path 81, 82 to the corresponding wheel brake FL, RR, RL, FR (on an upstream side of the corresponding wheel brake FL, RR, RL, FR; hereinafter, this hydraulic pressure path may be referred to as a "wheel hydraulic pressure path"). Thus, a differential pressure between an upstream and a downstream of the inlet valve 3 can be adjusted in accordance with a value of a driving current applied to the inlet valve 3. Since the inlet valve 3 is normally open, the inlet valves 3 allow brake hydraulic pressures to be applied from the brake hydraulic pressure generator 1 to the respective wheel brake FL, RR, RL, FR. If a wheel is about to be locked, the inlet valve 3 is closed under control of a not-shown control unit so as to block off the brake hydraulic pressure applied to the corresponding wheel brake FL, RR, RL, FR. The control unit is provided in a base body making up the hydraulic pressure control device 2, or the like.

Each outlet valve 4 is, for example, a normally close solenoid valve. Each outlet valve 4 is disposed between the corresponding wheel brake FL, RR, RL, FR and the corresponding reservoir 5 (disposed on a hydraulic pressure path which extends from a hydraulic pressure path located on a wheel cylinder W side of the inlet valve 3 and which leads to the reservoir 5, the pump 6 and the hydraulic pressure path 81 (or 82)). The outlet valve 4 is normally closed. However, as soon as the wheel is about to be locked, the outlet valve 4 is opened by the control unit so that the hydraulic pressure applied to the corresponding wheel brake FL, RR, RL, FR can be released to the corresponding reservoir 5.

Each check valve 3a is connected in parallel to the corresponding inlet valve 3. The check valve 3a is a valve which permits brake liquid to only flow toward the brake hydraulic pressure generator 1 (or toward the master cylinder 20) from the corresponding wheel brake FL, RR, RL, FR side. Even if the inlet valve 3 is closed in a state where no brake liquid is input from the brake hydraulic pressure generator 1 (or in a case where the input of the brake pedal P is cancelled), the check valve 3a permits brake liquid to flow toward the brake hydraulic pressure generator 1 from the corresponding wheel brake FL, RR, RL, FR side.

Each reservoir 5 has a function of reserving brake liquid which is released when the corresponding outlet valve 4 is opened. Also, each check valve 5a that permits brake liquid to only flow toward the corresponding pump 6 from the reservoir 5 side is provided between the corresponding reservoir 5 and the corresponding pump 6.

Each pump 6 has a function of suctioning brake liquid reserved in the corresponding reservoir 5 and returning the brake liquid to the brake hydraulic pressure generator 1 side through an orifice 7a. Thereby, the brake liquid suctioned by the reservoir 5 can be returned to the brake hydraulic pressure generator 1 side. Also, a brake hydraulic pressure can be generated, for example, regardless of presence or absence of brake effect on the brake pedal P, so that a braking force can be generated and applied to the corresponding wheel brake FL, RR, RL, FR. The amount of brake liquid ejected by the pump 6 depends on a rotation speed of the motor 6a.

Each orifice 9 attenuates pulsation of the pressure of brake liquid ejected from the corresponding pump 6.

Each pressure regulating valve R has a function of permitting brake liquid to flow toward the wheel hydraulic pressure path from the hydraulic pressure path 81 (or 82) in a normal state. Also, each pressure regulating valve R has such a function that when the pressure on the wheel cylinder W side is increased by the brake hydraulic pressure generated by the pump 6, each pressure regulating valve R blocks the flow of the brake liquid and adjusts the pressure on the wheel hydraulic pressure path side to be equal to or less than a set value. Each pressure regulating valve R includes a changeover valve 7 and a check valve 7a.

Each changeover valve 7 is a normally open proportional solenoid valve. Each changeover valve 7 is provided between (i) the hydraulic pressure path 81 (82) communicating with the brake hydraulic pressure generator 1 and (ii) the wheel hydraulic pressure path. Although not shown in detail, a valve body of each changeover valve 7 is urged in a valve closing direction by an electromagnetic force corresponding to a current applied to each changeover valve 7. If the pressure in the wheel hydraulic pressure path becomes equal to or higher than the pressure in the hydraulic pressure path 81 (82) by at least a predetermined value (which depends on the applied current), the brake liquid is released from the wheel hydraulic pressure path toward the hydraulic pressure path 81 (82) so that the pressure on the wheel hydraulic pressure path side (brake hydraulic pressure in the wheel brake FL, FR, RL, RR) can be regulated to the predetermined pressure. That is, a valve closing force is changed desirably in accordance with a value of a driving current (indicated current value) supplied to the changeover valve 7, so that a differential pressure between an upstream and a downstream of the changeover valve 7 can be regulated. Thus, the pressure in the wheel hydraulic pressure path can be regulated so as to be equal to or less than the set value.

Each check valve 7a is connected in parallel to the corresponding changeover valve 7. Each check valve 7a is a one-way valve that permits brake liquid to flow toward the wheel hydraulic pressure path from the hydraulic pressure path 81 (or 82).

Each suction valve 8 is a normally close solenoid valve. Each suction valve 8 is provided in a hydraulic pressure path extending from the hydraulic pressure path 81 (82) to the pump 6 (hereinafter, this hydraulic pressure path may be referred to as a "suction hydraulic pressure path"). Each suction valve 8 is provided to change over between (i) a state where the suction hydraulic pressure path is open and (ii) a state where the suction hydraulic pressure path is blocked. Each suction valve 8 is opened under the control of the control unit, for example, when the hydraulic pressure in the corresponding wheel brake FL, FR, RL, RR is increased by the pump 6.

The pressure sensor 80 is configured to detect the brake hydraulic pressure in the hydraulic pressure path 81 (82). A detection result of the pressure sensor 80 is input to the control unit.

In the hydraulic pressure control device 2 configured as described above, the control unit controls the open/closed states of the inlet valves 3 and the outlet valves 5 so as to regulate the brake hydraulic pressures (caliper hydraulic pressures) acting on the wheel cylinders W of the wheel brakes FL, RR, RL, RR. For example, when the brake pedal P is depressed in the normal state where the inlet valve 3 is open and the outlet valve 4 is closed, the hydraulic pressure from the brake hydraulic pressure generator 1 is transmitted directly to the wheel cylinder W so as to increase the pressure therein. On the other hand, in the state where the inlet valve 3 is closed and the outlet valve 4 is open, the brake liquid flows out from the wheel cylinder W toward the reservoir 5 so as to reduce the caliper hydraulic pressure and to bring the wheel cylinder W into a pressure reduction state. In the state where both the inlet valve 3 and the outlet valve 4 are closed, the caliper hydraulic pressure is kept and the wheel cylinder W is brought into a pressure holding state.

Next, an operation of the vehicle brake system A will be described schematically.

Figure 4:
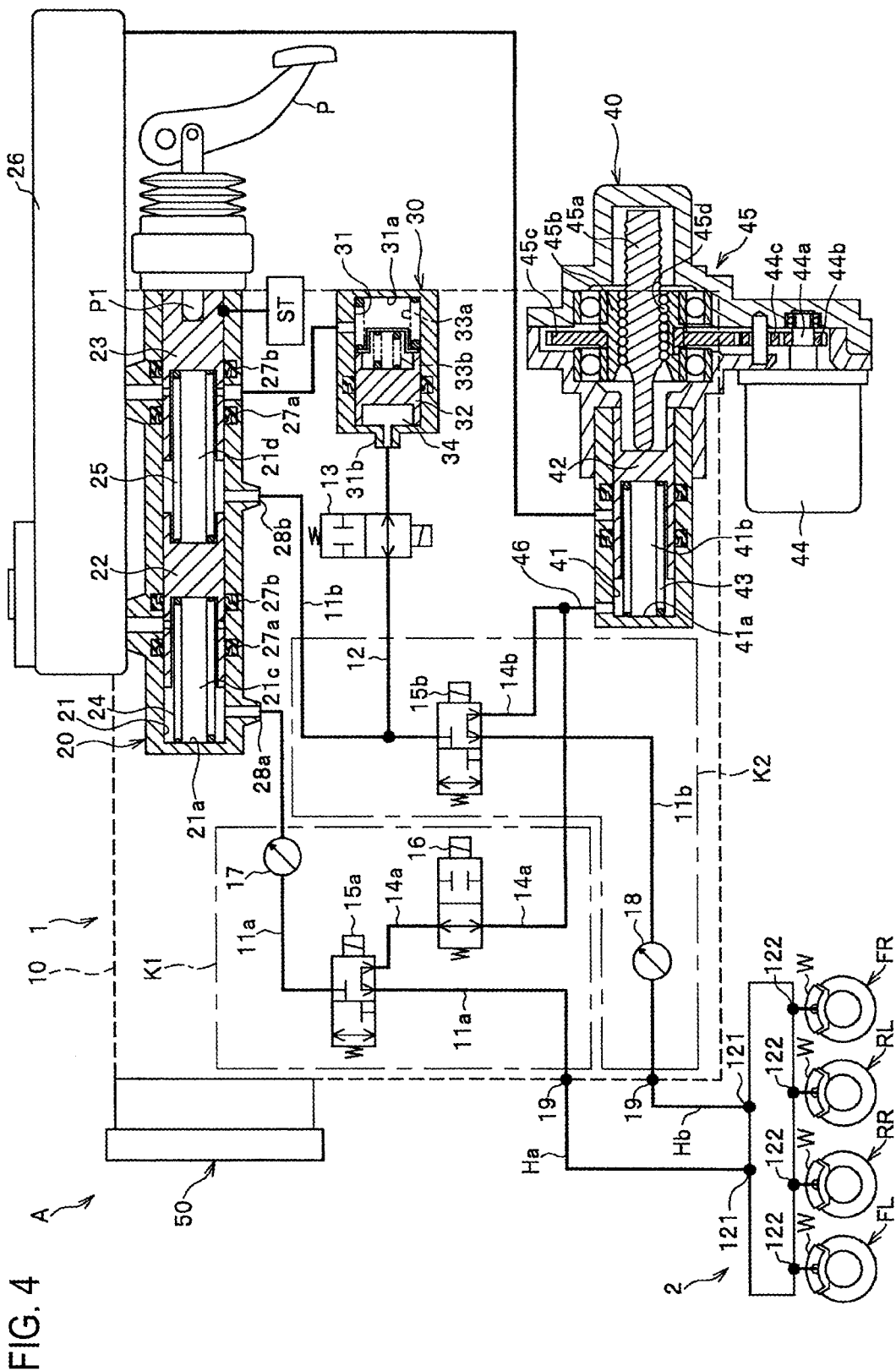
FIG. 4 is a hydraulic pressure circuit diagram when the brake hydraulic pressure generator shown in FIG. 1 is started up.

In the vehicle brake system A, if the stroke sensor ST detects that the brake pedal P has been operated slightly, (i) the downstream side of the first main hydraulic pressure path 11a and the first communication path 14a are connected through the first changeover valve 15a and (ii) the downstream side of the second main hydraulic pressure path 11b and the second communication path 14b are connected through the second changeover valve 15b, as shown in FIG. 4. As a result, disconnection is established between the upstream and downstream sides of the first main hydraulic pressure path 11a, and disconnection is established between the upstream and downstream sides of the second main hydraulic pressure path 11b. Also, the normally close solenoid valve 13 is opened.

In this state, the brake hydraulic pressure generated in the master cylinder 20 in accordance with the operation of the brake pedal P is not transmitted to the wheel cylinders W but is transmitted to the stroke simulator 30. Then, the brake hydraulic pressure in the pressure chamber 34c increases, and the simulator piston 32 moves toward the bottom surface 31a against the urging force of the elastic member 33. At that time, the simulator piston 32 urged by the elastic member 33 imparts a pseudo operational reaction force to the brake pedal P.

Also, if the stroke sensor ST detects that the brake pedal P has been depressed, the motor 44 of the slave cylinder 40 is driven by the electronic control unit 50. As a result, the slave cylinder piston 42 moves toward the bottom surface 41a so as to apply a pressure to the brake liquid in the hydraulic pressure chamber 41b.

The electronic control unit 50 compares the brake hydraulic pressure output from the slave cylinder 40 (the brake hydraulic pressure detected by the second pressure sensor 18) with the brake hydraulic pressure output from the master cylinder 20 (the brake hydraulic pressure corresponding to the operation amount of the brake pedal P). Then, the electronic control unit 50 controls the rotation speed of the motor 44 and the like based on the comparison result. In this manner, the brake hydraulic pressure generator 1 generates a brake hydraulic pressure in accordance with the operation amount of the brake pedal P.

The brake hydraulic pressure generated in the brake hydraulic pressure generator 1 is transmitted to the respective wheel cylinders W through the hydraulic pressure control device 2. Thus, the wheel cylinders W are operated to apply braking forces to the wheels.

Figure 5:
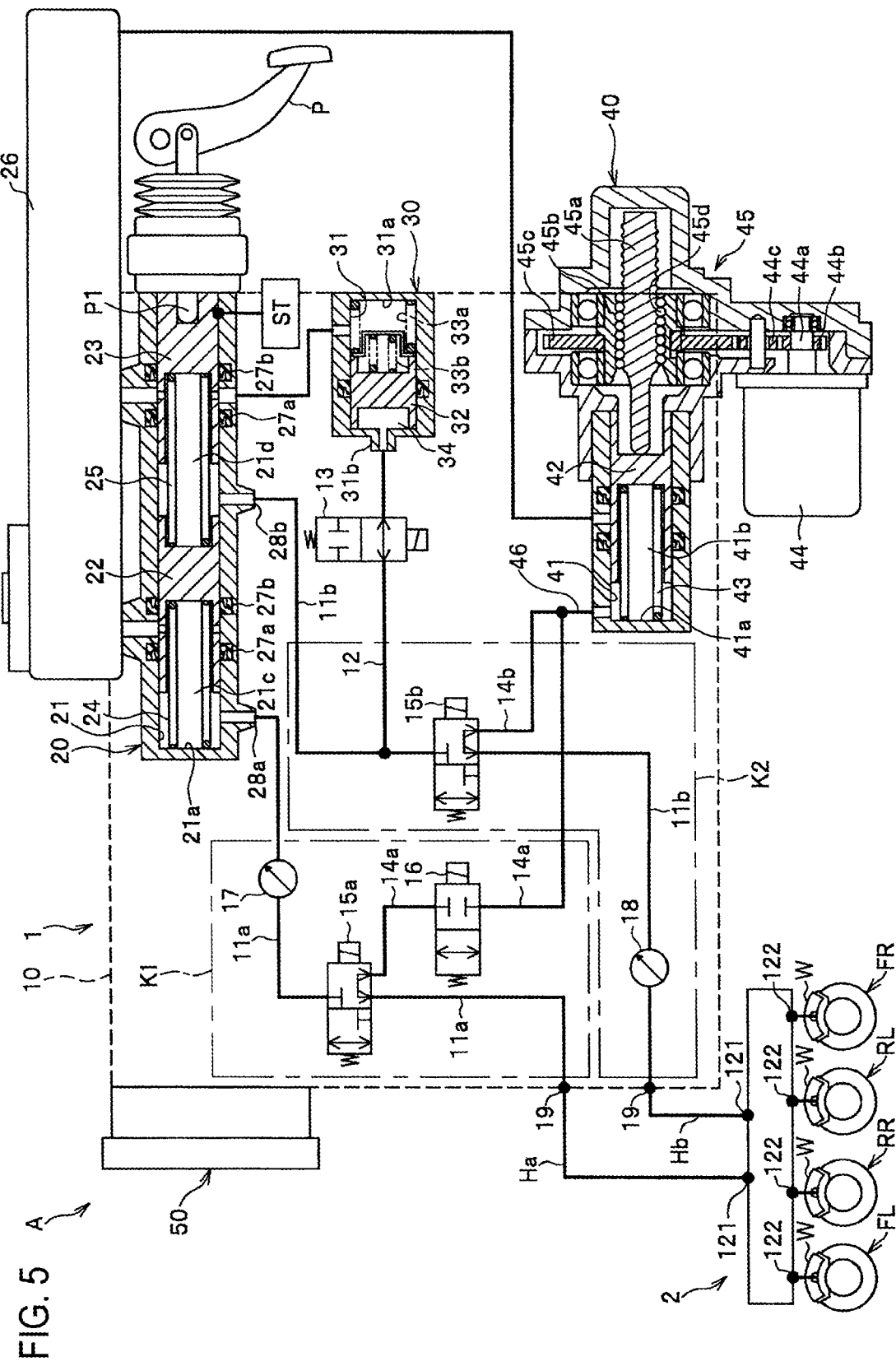
FIG. 5 is a hydraulic pressure circuit diagram showing how the vehicle brake system operates when a brake liquid has decreased in either a first main hydraulic pressure path or a second main hydraulic pressure path.

Next, if brake liquid in any of the first main hydraulic pressure path 11a and the second main hydraulic pressure path 11b decrease in the state where the brake pedal P is depressed and the motor 44 of the slave cylinder 40 is driven, the electronic control unit 50 determines that the brake hydraulic pressure detected by the second pressure sensor 18 has not increased to the brake hydraulic pressure corresponding to the operation amount of the brake pedal P, and executes control to close the normally open solenoid valve 16 as shown in FIG. 5. As a result, disconnection is set between the first main hydraulic pressure path 11a and the slave cylinder 40. Thus, the slave cylinder 40 is connected only to the second main hydraulic pressure path 11b side.

If the electronic control unit 50 determines that the brake hydraulic pressure on the downstream side of the first main hydraulic pressure path 11a and the brake hydraulic pressure on the downstream side of the second main hydraulic pressure path 11b increase (or is resumed) to the brake hydraulic pressure corresponding to the operation amount of the brake pedal P after executing the valve closing control, the electronic control unit 50 continues the control to increase the pressure by the slave cylinder 40 while keeping the normally open solenoid valve 16 in the closed state. That is, the electronic control unit 50 determines that the brake liquid decreases on the downstream side of the first main hydraulic pressure path 11a, and continues to increase the hydraulic pressure in the second main hydraulic pressure path 11b by the slave cylinder 40. Thereby, braking by the slave cylinder 40 can be ensured in the second main hydraulic pressure path 11b. The disconnection between the first main hydraulic pressure path 11a and the slave cylinder 40 is kept.

Figure 6:
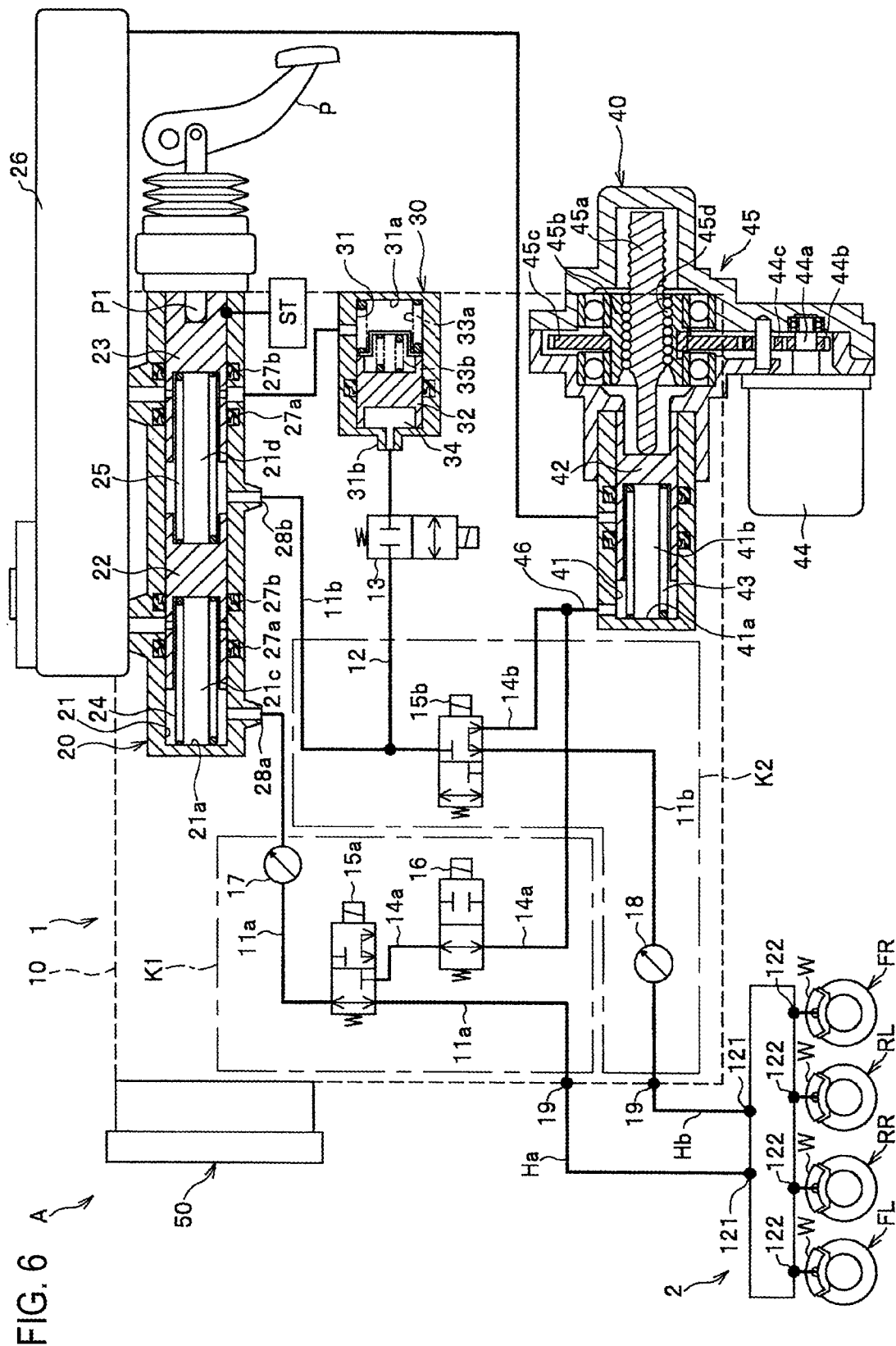
FIG. 6 is a hydraulic pressure circuit diagram showing how the vehicle brake system operates when brake liquid has decreased in the first main hydraulic pressure path.

On the other hand, if the electronic control unit 50 determines that the brake hydraulic pressure is not resumed after executing the valve closing control, the electronic control unit 50 executes control (i) to bring the normally open solenoid valve 16 into an open state (back to its initial state), (ii) to stop the motor 44, and (iii) to change over the first changeover valve 15a (back to its initial state) so as to connect between the upstream and downstream sides of the first main hydraulic pressure path 11a, as shown in FIG. 6. The electronic control unit 50 also brings the normally close solenoid valve 13 into a closed state (back to its initial state so as to stop the flow of the brake fluid from the master cylinder 20 to the stroke simulator 30). As a result, the brake hydraulic pressure generated in the master cylinder 20 is transmitted directly to the wheel cylinders (wheel brakes) on the downstream side of the first main hydraulic pressure path 11a. The second changeover valve 15b still disconnects between the upstream and downstream sides of the second main hydraulic pressure path 11b. Thereby, the brake hydraulic pressure generated in the master cylinder 20 is prevented from being imparted to the downstream side of the second main hydraulic pressure path 11b.

In the state where the slave cylinder 40 is not operating (for example, in a case where ignition is OFF or electric power is not supplied thereto), the first changeover valve 15a and the second changeover valve 15b are returned to their initial states, and the normally close solenoid valve 13 is closed (see FIG. 1). When the first changeover valve 15a and the second changeover valve 15b are returned to their initial states, the upstream and downstream sides of the first main hydraulic pressure path 11a communicate with each other, and the upstream and downstream sides of the second main hydraulic pressure path 11b communicate with each other. In this state, the brake hydraulic pressure generated in the master cylinder 20 is transmitted directly to the respective wheel cylinders W.

In the brake hydraulic pressure generator 1 configured as described above, the slave cylinder 40 is configured by the single piston 42. Therefore, the slave cylinder 40 can be produced to be smaller than a case where a slave cylinder is of a tandem type. Thus, the brake hydraulic pressure generator 1 can be reduced in size.

Also, since the normally open solenoid valve 16 is provided in the first communication path 14a, the flow of the brake liquid from the slave cylinder 40 to the first main hydraulic pressure path 11a can be blocked. That is, such a state can be realized that the flow of the brake liquid from the slave cylinder 40 to the first main hydraulic pressure path 11a is blocked while the flow of the brake liquid from the slave cylinder 40 to the second main hydraulic pressure path 11b is allowed. Accordingly, even if the brake liquid decreases in the first main hydraulic pressure path 11a, the hydraulic pressure in the second main hydraulic pressure path 11b can be increased by the slave cylinder 40.

Also, the normally open solenoid valve 16 is configured to open/close the first communication path 14a. Therefore, the normally open solenoid valve 16 may be controlled to be closed only when the flow of the brake liquid from the slave cylinder 40 to the first main hydraulic pressure path 11a is to be blocked. Thereby, it is possible to reduce power consumption in normal time.

Also, three-way valves (solenoid valves) are used as the first changeover valve 15a and the second changeover valve 15b. Therefore, each hydraulic pressure path can be changed over suitably between connection and disconnection by a single solenoid valve. Thus, the configuration can be simplified. This contributes to size reduction of the brake hydraulic pressure generator 1.

Also, in the exemplary embodiment, the system in which the normally open solenoid valve 16 is disposed (the system of the first main hydraulic pressure path 11a) and the system in which the second pressure sensor 18 is disposed (the system of the second main hydraulic pressure path 11b) are provided as different systems from each other. With this configuration, when the brake liquid decreases in any of the two main hydraulic pressure paths 11a and 11b, the decrease can be detected more accurately based on the detection value of the second pressure sensor 18.

That is, if the brake hydraulic pressure detected by the second pressure sensor 18 increases in the state where the normally open solenoid valve 16 is closed to block the system of the first main hydraulic pressure path 11a, it can be understood that the brake liquid in the first main hydraulic pressure path 11a decreases. In this case, the control to increase the pressure by the slave cylinder 40 is continued so that braking in the wheel brakes by the slave cylinder 40 can be ensured in the second main hydraulic pressure path 11b.

On the other hand, if the brake hydraulic pressure detected by the second pressure sensor 18 does not increase in the state where the normally open solenoid valve 16 is closed to block the system of the first main hydraulic pressure path 11a, it can be understood that the brake liquid in the second main hydraulic pressure path 11b where the second pressure sensor 18 is disposed decreases. Then, in this case, the motor 44 is controlled to stop, the normally close solenoid valve 13 is closed (back to its initial state), and the first changeover valve 15a in the first hydraulic pressure path 11a is changed over to connect between the upstream and downstream sides of the hydraulic pressure path 11a. Thereby, connection is established between the master cylinder 20 and the wheel brakes. As a result, the hydraulic pressure generated in the master cylinder 20 is transmitted directly to the wheel cylinders W (wheel brakes) through the first main hydraulic pressure path 11a.

Also, the master cylinder 20 includes the two pistons, that is, the first piston 22 and the second piston 23. The master cylinder 20 can appropriately output the hydraulic pressure generated in the master cylinder 20 to the two main hydraulic pressure paths 11a and 11b. The first pressure sensor 17 serving as the master pressure sensor is disposed in one of the two main hydraulic pressure paths 11a and 11b (for example, in the main hydraulic pressure path 11a). The stroke simulator 30 is disposed in the other of the main hydraulic pressure paths 11a and 11b (for example, in the main hydraulic pressure path 11b) through the normally close solenoid valve 13. With this configuration, the master cylinder 20 which is of the tandem type including the first piston 22 and the second piston 23 and the slave cylinder 40 which has the single slave cylinder piston 42 can be combined suitably. Thus, it is possible to provide the brake hydraulic pressure generator 1 in which, even if the brake liquid decreases in one of the two main hydraulic pressure paths 11a and 11b decreases, influence of the decrease hardly reaches the other hydraulic pressure path.

The exemplary embodiment illustrates the configuration that the normally open solenoid valve 16 is provided in the system of the first main hydraulic pressure path 11a and the second pressure sensor 18 is disposed in the system of the second main hydraulic pressure path 11b. To the contrary, such a configuration may be adopted that the second pressure sensor 18 is disposed in the system of the first main hydraulic pressure path 11a and the normally open solenoid valve 16 is provided in the system of the second main hydraulic pressure path 11b.

In this case, if the brake hydraulic pressure detected by the second pressure sensor 18 increases in a state where the normally open solenoid valve 16 is closed to block the system of the second main hydraulic pressure path 11b, it can be understood that the brake liquid decreases in the second main hydraulic pressure path 11b. Then, in this case, the control to increase the pressure by the slave cylinder 40 is continued so that braking in the wheel brakes by the slave cylinder 40 can be ensured in the first main hydraulic pressure path 11a.

Also, if the brake hydraulic pressure detected by the second pressure sensor 18 does not increase in the state where the normally open solenoid valve 16 is closed to block the system of the second main hydraulic pressure path 11b, it can be understood that the brake liquid in the first main hydraulic pressure path 11a where the second pressure sensor 18 is disposed decreases. Then, in this case, the motor 44 is controlled to stop, the normally close solenoid valve 13 is closed (back to its initial state), and the second changeover valve 15b in the second hydraulic pressure path 11b is changed over so that the upstream side of the hydraulic pressure path 11b communicates with the downstream side of the hydraulic pressure path 11b. Thereby, a connection is established between the master cylinder 20 and the wheel brakes. As a result, the hydraulic pressure generated in the master cylinder 20 is transmitted directly to the wheel cylinders W (wheel brakes) through the second main hydraulic pressure path 11b.

Second Embodiment

Figure 7:
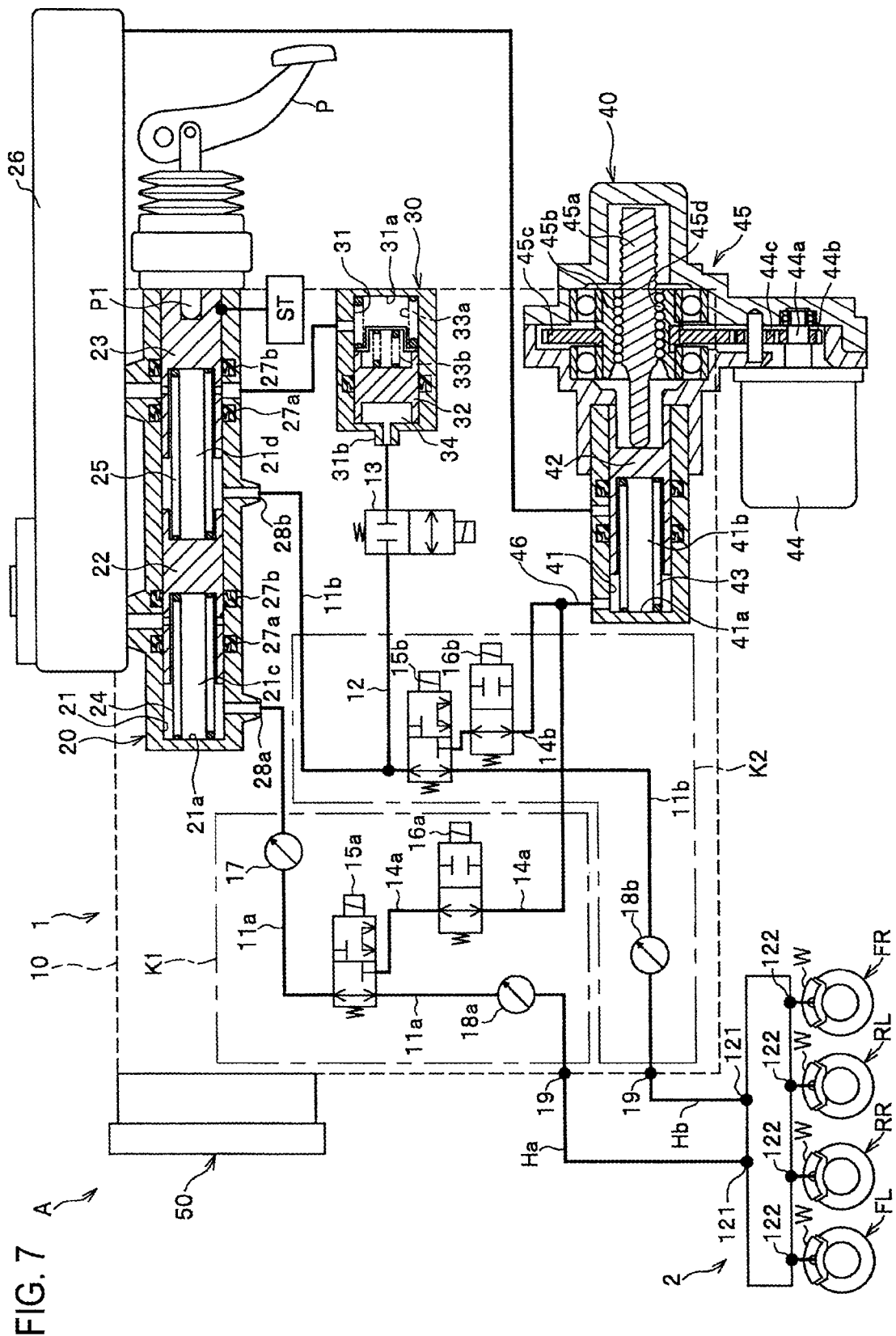
FIG. 7 is a hydraulic pressure circuit diagram showing a vehicle brake system including a brake hydraulic pressure generator according to a second embodiment of the invention.

A second embodiment will be described with reference to FIG. 7. In the second embodiment, a normally open solenoid valve 16a and a second pressure sensor 18a are provided in the system of the first main hydraulic pressure path 11a. Also, a normally open solenoid valve 16b and a second pressure sensor 18b are provided in the system of the second main hydraulic pressure path 11b. The normally open solenoid valves 16a and 16b correspond to the normally open solenoid valve 16. Also, the second pressure sensors 18a and 18b correspond to the second pressure sensor 18.

In a case where brake liquid decreases in any of the systems in this configuration, for example, if the brake hydraulic pressure detected by the second pressure sensor 18b in the second main hydraulic pressure path 11b increases in a state where the normally open solenoid valve 16a in the system of the first main hydraulic pressure path 11a is closed to block the system of the first main hydraulic pressure path 11a, it can be understood that the brake liquid decreases in the first main hydraulic pressure path 11a. To the contrary, if the brake hydraulic pressure detected by the second pressure sensor 18b in the second main hydraulic pressure path 11b does not increase, it can be understood that the brake liquid in the second main hydraulic pressure path 11b decreases.

If the brake liquid in the first main hydraulic pressure path 11a decreases, the control to increase the pressure by the slave cylinder 40 is continued while the normally open solenoid valve 16a in the first main hydraulic pressure path 11a is kept in the closed state. Thereby, braking in the wheel brakes by the slave cylinder 40 can be ensured in the second main hydraulic pressure path 11b.

On the other hand, if the brake liquid in the second main hydraulic pressure path 11b decreases, the normally open solenoid valve 16a in the first main hydraulic pressure path 11a is controlled to be open while the normally open solenoid valve 16b in the second main hydraulic pressure path 11b is controlled to be closed, and the control to increase the pressure by the slave cylinder 40 is continued. Thereby, braking in the wheel brakes by the slave cylinder 40 can be ensured in the first main hydraulic pressure path 11a.

In this manner, either if the brake liquid in the first main hydraulic pressure path 11a decreases or if the brake liquid in the second main hydraulic pressure path 11b decreases, braking in the wheel brakes by the slave cylinder 40 can be ensured in the system where the brake liquid does not decrease.

What is claimed is:

1. A brake hydraulic pressure generator comprising:
a first brake system that communicates with at least one of a plurality of wheel brakes;
a second brake system that communicates with the other wheel brakes;
a master cylinder that operates in response to driver's operation of a brake operator;
a first main hydraulic pressure path that is provided in the first brake system and that connects between the master cylinder and the at least one wheel brakes;
a second main hydraulic pressure path that is provided in the second brake system and that connects between the master cylinder and the other wheel brakes;
master cut valves that are provided in the first main hydraulic pressure path and the second main hydraulic pressure path, respectively, the master cut valves configured to open and close the first main hydraulic pressure path and the second main hydraulic pressure path, respectively;
a slave cylinder that is operated by an electric actuator which is driven in accordance with an operation amount of the brake operator;
a first communication path that connects between the slave cylinder and the first main hydraulic pressure path; and a second communication path that connects between the slave cylinder and the second main hydraulic pressure path; wherein the slave cylinder includes a single hydraulic pressure chamber, the slave cylinder communicates with the first communication path and the second communication path through a common flow path connected to the hydraulic pressure chamber, the slave cylinder is configured to be able to increase a pressure in the first main hydraulic pressure path or the second main hydraulic pressure path on a downstream side of corresponding one of the master cut valves, through the first communication path or the second communication path;

an on-off valve is provided in at least one of the first communication path and the second communication path;

the on-off valve comprises a first valve and a second valve;

the first valve is provided in a system of the first main hydraulic pressure path; and the second valve is provided in a system of the second main hydraulic pressure path.

2. The brake hydraulic pressure generator according to claim 1, wherein the on-off valve includes a normally open solenoid valve.

3. The brake hydraulic pressure generator according to claim 1, wherein each master cut valve includes a three-way valve configured to change over between (i) a state where connection is established between a master cylinder side and a wheel brake side while disconnection is established between a slave cylinder side and the wheel brake side, and (ii) a state where disconnection is established between the master cylinder side and the wheel brake side while connection is established between the slave cylinder side and the wheel brake side.

4. The brake hydraulic pressure generator according to claim 1, further comprising:

a pressure sensor that is disposed in the first main hydraulic pressure path or the second main hydraulic pressure path on the downstream side of the corresponding one of the master cut valves; and a controller configured to execute control to open and close the on-off valve, a detection value of the pressure sensor being input to the controller, wherein the on-off valve is disposed in the first communication path, the pressure sensor is provided in the second main hydraulic pressure path, and the controller is configured to determine as to whether or not the detection value of the pressure sensor has increased to a value corresponding to the operation amount of the brake operator and to execute control to close the on-off valve if the controller determines that the detection value has not increased to the value.

5. The brake hydraulic pressure generator according to claim 4, wherein if the detection value of the pressure sensor is resumed to the value corresponding to the operation amount of the brake operator after executing the control to close the on-off valve, the controller continues control to increase pressure by the slave cylinder while keeping the on-off valve in a closed state.

6. The brake hydraulic pressure generator according to claim 1, wherein the master cylinder includes two pistons, the master cylinder is configured to be able to output a hydraulic pressure generated in the master cylinder to the first main hydraulic pressure path and the second main hydraulic pressure path, and the brake hydraulic pressure generator further comprising:

a master pressure sensor that is disposed in one of the first main hydraulic pressure path and the second main hydraulic pressure path and that is configured to detect the hydraulic pressure generated in the master cylinder; and a simulator that is disposed in the other of the first main hydraulic pressure path and the second main hydraulic pressure path through a valve and that is configured to impart to the brake operator an operational reaction force corresponding to the operation of the brake operator, in a pseudo manner.

\* \* \* \* \*